United States Patent

[11] 3,632,461

[72] Inventors Herbert Gayner
Monroeville, Pa.;
John N. Demsey, Jr., Oakland, Calif.
[21] Appl. No. 825,164
[22] Filed May 16, 1969
[45] Patented Jan. 4, 1972
[73] Assignee Aluminum Company of America
Pittsburgh, Pa.

[54] METHOD OF MAKING A LAMINATED CONTAINER WALL STRUCTURE
7 Claims, 5 Drawing Figs.

[52] U.S. Cl. .................................................... 156/257, 220/53
[51] Int. Cl. ....................................................... B32b 31/20
[50] Field of Search ............................................ 220/53; 156/257; 156/330; 113/80 DA, 15 A, 120 Q, 121 AC

[56] References Cited
UNITED STATES PATENTS

| | | | |
|---|---|---|---|
| 3,251,503 | 5/1966 | Bozek............................ | 220/54 |
| 2,978,140 | 4/1961 | Walsh............................ | 220/53 X |
| 3,358,873 | 12/1967 | Gelber........................... | 220/53 |
| 3,380,622 | 4/1968 | Garavaglia et al. .......... | 220/53 |
| 3,389,827 | 6/1968 | Abere et al. ................... | 220/53 |
| 3,475,240 | 10/1969 | Manaka et al. ............... | 156/330 X |
| 3,481,813 | 12/1969 | Wiggers........................ | 156/257 |

*Primary Examiner*—Benjamin A. Borchelt
*Assistant Examiner*—Daniel A. Bent
*Attorney*—Arnold B. Silverman ABSTRACT: A method of manufacturing a laminated metal container wall having an integral opening device. Providing a metal sheet, coating the sheet with an adhesive selected from the group consisting of epoxy, polyester and polyurethane and subsequently securing to the sheet by means of the adhesive a continuous layer of barrier material selected from the group consisting of low-density polyethylene, high-density polyethylene and cast polypropylene. Subsequently scoring said sheet to define a severable and/or removable sector and leaving residual metal along the score line of a thickness of about 0.002 to 0.006 inch. Effecting the scoring while preserving the integrity of the barrier by maintaining continuity of the layer of barrier material. Simultaneously with the scoring operation reducing the thickness of the barrier material in the regions underlying the scoring through compressibly established flow without penetrating entirely through the layer. This compressibly established flow serves to reduce the shear resistance to severance of the barrier when the laminated container wall is opened. An outer protective material selected from the group consisting of a polyester, polyvinylidene chloride, polyvinyl chloride and medium- or high-density polyethylene may be continuously secured to the barrier material.

A laminated metal container wall made by the above method having a barrier material thickness of about 0.002 to 0.003 inch in the portion not underlying the score line and a reduced thickness in the portion underlying the score line. The barrier material having a continuous panel covering structure. An outer protective material selected from the medium-consisting of a polyester, polyvinylidene chloride, polyvinyl chloride and medium- or high-density polyethylene secured to the barrier material.

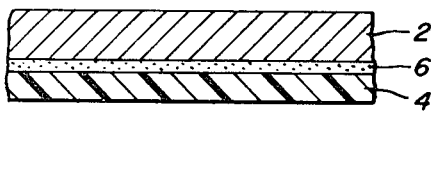
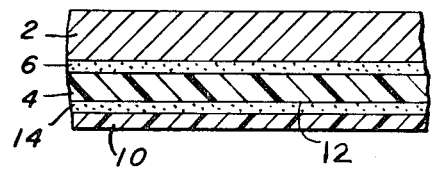
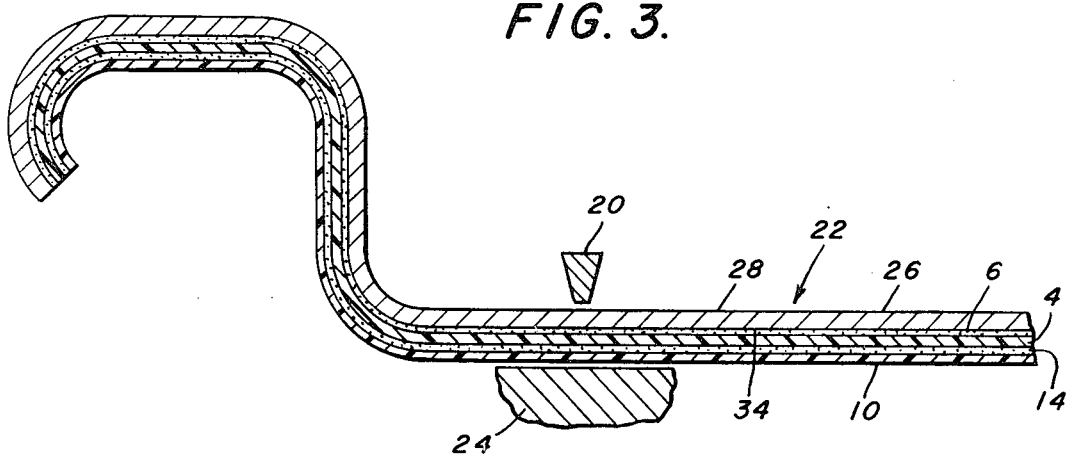
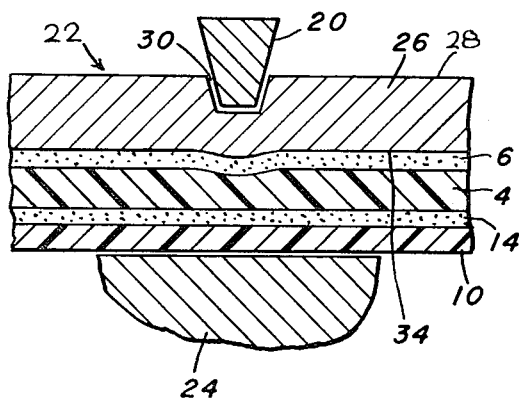
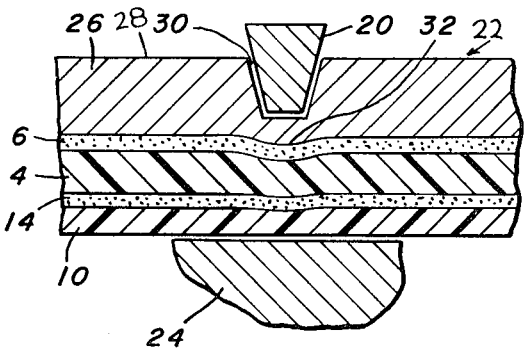
INVENTORS.
HERBERT GAYNER &
JOHN N. DEMSEY, JR.

METHOD OF MAKING A LAMINATED CONTAINER WALL STRUCTURE

BACKGROUND OF THE INVENTION

1. Field of the Invention

This invention relates to a laminated metal container wall having an integral opening device provided with a scored removable sector and the product manufactured thereby. In addition and more specifically, this invention relates to the method of manufacturing a metal container wall without destroying a protective barrier continuously adhesively bonded to the wall.

2. Description of the Prior Art

Containers having a metal container wall provided with an integral opening device which eliminates the need for the use of a separate opener to gain access to the container contents have long been known and used commercially. One of the preferred forms of opening devices found frequently in container walls, such as jar and bottle closures and can ends, has a removable sector defined within a metal panel portion which has been weakened by scoring part way but not completely through the panel. An operating member, which is frequently in a form of a lever providing a mechanical advantage, is secured to the removable sector. In gaining access to the contents of the container, the consumer merely employs the operating lever to sever the removable sector from the container wall.

In the conventional commercial method of manufacturing sheet for such container walls, the metal sheet is coated on both sides with a solvent-based organic coating. The sheet is then heated to a sufficiently high temperature to evaporate the solvent and cure the coating. Container wall blanks are then severed from the sheet and formed into container walls. These container walls are subsequently converted to provide integral easy opening devices.

The end or closure panel is scored by the impact force of an indenter tool. During this process the container wall is supported upon a generally flat anvil surface. As a result of the tremendous forces which are applied to the end wall during forming, the coating on the panel undersurface is fractured. Were the wall to be used in this condition, this fractured coating would permit the container contents which are frequently potentially corrosive to contact the exposed metal and attack the same. With respect to food, many products are particularly troublesome. For obvious reasons, food packers desire a single container system suitable for use for a full product line regardless of varying chemical properties among different products. Also, should the end wall be made of a different material than the can body, as is the case where an aluminum end is placed upon a tin plate can, the aluminum might function as a sacrificial anode and corrode.

As a result of this substantial corrosion hazard it is found necessary in commercial practice to place a repair coating upon the undersurface of the container wall after scoring has been completed. This, of course, requires additional handling of the can end, the use of additional equipment, the addition of another process step during manufacture and the use of additional material.

It has also been suggested to score the metal panel prior to coating the undersurface. This alternative also has significant disadvantages. If the sheet were scored prior to severance of the end wall blanks, there would be the risk that the score line might be fractured during subsequent forming operations. If, on the other hand, each end wall were to be individually coated after scoring, this would necessitate individual handling during the coating process. It would also result in the difficulty of providing a continuous uniform coating to the irregularly shaped end wall.

SUMMARY OF THE INVENTION

This invention has solved the above enumerated problems by providing a method of manufacture and structure for a scored container wall having an integral opening device. The metal sheet is protectively covered by a continuous adhesively bonded thermoplastic barrier material which will be reformed but not fractured responsive to the substantial compressive force applied by the scoring tools. The barrier material will remain continuous throughout the scoring operation and thereafter. It also will have such a thickness as to provide an effective protective barrier between the undersurface of the container wall and the container contents during storage.

In the method of this invention a film of barrier material is continuously adhesively secured to the undersurface of the metal container wall. The adhesive is selected from the group consisting of epoxy, polyester and polyurethane. The barrier material is selected from the group consisting of low density polyethylene, high density polyethylene and cast polypropylene. After manufacture of the laminate, the metal is subsequently scored, either before or after severance of container wall blanks from the sheet. Scoring is effected to such a depth as to leave a metal residual along the score line of about 0.002 to 0.006 inch (2 to 6 mils). During the scoring operation, the thickness of the film of barrier material is reduced in the region underlying the score line as a result of the flow of barrier material responsive to the compressive force.

In one form, the barrier material has a thickness of about 0.002 to 0.003 inch. An outer protective material selected from the group consisting of a polyester, polyvinylidene chloride, polyvinyl chloride and medium or high density polyethylene is secured to the barrier material. This may be laminated to the barrier material by direct adhesion or secured thereto by means of an independent adhesive. Where an independent adhesive is employed, this second adhesive is selected from the group consisting of epoxy, polyester and polyurethane. The product of the above method may have a metal panel with a thickness in the unscored portion from about 0.008 to 0.0145 inch and a narrow range of residual metal thickness of about 0.0025 to 0.0045 inch in the scored portions.

It is an object of this invention to provide a method of manufacturing a laminated container wall with a continuously adhesively bonded barrier material secured to the underside of a metal panel or sheet in such fashion as to resist destruction of continuity of the protective barrier when the laminate is subjected to the substantial force encountered during scoring of the metal panel.

It is another object of this invention to provide a laminated container wall having a scored integral opening device wherein the score line is of substantial depth and a substantial score residual remains with a continuous corrosion resistant barrier adhesively bonded to the metal undersurface and of sufficient thickness to resist corrosive attack on the metal by the container contents during storage.

It is another object of this invention to provide a barrier composed of one or more corrosion resistant materials laminated to the metal panel in sufficient thickness to resist film fracture and adhesive failure during both score line formation and subsequent storage of a filled container to which it is secured.

It is yet another object of this invention to provide such a container wall structure simply and economically without the need for any repair coating to the container wall undersurface after the scoring operation.

These and other objects of this invention will be more fully understood and appreciated from the following detailed description of the invention, on reference to the illustrations appended hereto.

BRIEF DESCRIPTION OF THE DRAWINGS

FIG. 1 is a fragmentary sectional elevation of one form of sheet laminate of this invention.

FIG. 2 is similar to FIG. 1 but shows a modified form of laminate contemplated by this invention.

FIG. 3 illustrates a fragmentary sectional elevation of a can end of this invention showing the scoring tools in position prior to the initiation of scoring.

FIGS. 4 and 5 are enlarged sectional elevations showing a portion of FIG. 3 during the intermediate and final stages of score line formation, respectively.

DESCRIPTION OF THE PREFERRED EMBODIMENTS

Referring more specifically to the drawings, FIG. 1 illustrates a metal sheet 2 to which there is continuously bonded a layer of barrier material 4, which is preferably in the form of a film. Bonding is effected through a coating of adhesive material 6. The metal sheet 2 may be any material suitable for use in a container wall, be it a can end or closure. Aluminum and tin plated steel are suitable for such purposes.

As used herein the terms "container wall" and "container end wall" will be employed as a convenient means of generically referring to various structural container portions having integral devices for assisting severance and/or removal of at least a portion thereof to permit access to the container contents. Closures for jars and bottles and can ends are among the specific forms contemplated by the use of these terms.

The barrier material 4 must be carefully selected, as it must have sufficient mechanical strength to resist destruction or excessive thinning during the application of the substantial force applied by the scoring tools. Among the materials found to be suitable for such purposes are polyethylene and cast polypropylene. The material is preferably provided in the form of a film having a thickness of 0.002 to 0.003 inch (2 to 3 mils) and is continuously bonded to the metal sheet by means of the adhesive material 6.

With respect to polyethylene density, polyethylene of different densities can perform effectively, with a preference of one, within the limitations specified herein, being based primarily upon the nature of the specific product to be stored in the container. As used herein, "low density polyethylene" means a polyethylene material having a density of about 0.91 to 0.925, "medium density polyethylene" means a polyethylene material having a density of about 0.926 to 0.941 and "high density polyethylene" means a polyethylene material having a density of about 0.942 to 0.965. It has been found that the high density polyethylene provides a more effective barrier with respect to preventing corrosive product contact with the metal undersurface. The low density polyethylene exhibits better mechanical strength with respect to the compressive impact of the scoring tools and also exhibits better bonding properties with respect to the metal end wall. The medium density polyethylene exhibits barrier, compressive and bonding properties intermediate the high and low density polyethylene.

It is important that the adhesive 6 be carefully selected in order to provide continuous bonding between the metal sheet 2 and the barrier material 4. The adhesive must maintain the strength of bond during the scoring operation. In this respect it is noted that the undersurface of the metal sheet 2 is generally deformed slightly downwardly during the scoring operation (FIG. 5). The adhesive bond continuity must survive the substantial compressive forces employed to establish this deformation, as well as the compressive forces applied during physical dislocation produced by this displacement. In addition, the adhesive must after having been subjected to the scoring operation exhibit continued strength of bond during the period of storage of the sealed container.

The adhesives which are preferred for purposes of this invention are epoxy, polyurethane and polyester adhesives. A suitable epoxy adhesive is that sold under the trade name Shell ADX57B and a suitable polyurethane adhesive is that sold under the trade name Adcote 102. These adhesives are applied in coating form in quantities of about 1.0 to 5.0 mg./sq. in. and preferably about 1.0 to 3.0 mg./sq. in. In order to obtain the maximum intimacy of bond, it is preferable to cure the adhesive. This may be accomplished by heating at a temperature of 150° to 475° F. for a period of about 10 to 60 minutes. Such heating may conveniently be effected either during lamination, as by means of a hot nip or subsequent thereto. In addition, with respect to some adhesives, it may be desirable to add a relatively small quantity of a catalyst frequently used for the particular adhesive in a conventional fashion.

Another form of sheet structure contemplated by this invention is illustrated in FIG. 2. In this FIG., the barrier member 4 is laminated to one surface of a metal sheet by means of an adhesive 6. An outer protective member 10, which is preferably in the form of a film, is continuously bonded to the exposed surface 12 of barrier member 4 by means of an adhesive 14. The adhesive 14 is preferably selected from the group consisting of epoxy, polyurethane and polyester and applied as a coating in quantities of about 1.0 to 5.0 mg./sq. in., preferably about 1.0 to 3.0 mg./sq. in.

If desired, the adhesive 14 may be eliminated and outer protective member 10 may be directly bonded to barrier member 4 by means of direct lamination without an independent adhesive. This may be accomplished either prior to or after securance of barrier member 4 to metal sheet 2, although securance prior will generally be more convenient.

The form of laminated material illustrated in FIG. 2 provides a structure having increased mechanical strength and barrier properties with respect to that form illustrated in FIG. 1. The outer protective member 10 preferably has a thickness of about 0.00025 to 0.001 inch. The barrier member 4 being substantially thicker than outer protective member 10 provides a ply of increased compressibility which will absorb a greater proportion of the compressive scoring force through compressive deformation and ultimate flow than the outer protective member. The outer protective material 10 is preferably composed of a polyester such as polyethylene teraphthalate resin, polyvinylidene chloride, polyvinyl chloride or a medium or high density polyethylene. A suitable polyester is that sold under the trade name Mylar. A suitable polyvinylidene chloride is that sold under the trade name Saran.

The polyesters exhibit extreme resistance to fracture which provides marked improvement in the mechanical properties of the laminate in resisting the compressive force encountered in scoring. Polyvinylidene chloride exhibits extremely high resistance to penetration by potentially corrosive materials such as acids.

In the method of this invention, after manufacturing the laminated metal sheet, scoring may be effected either while the sheet is intact or after individual container wall blanks have been severed from the sheet. In commercial practice, it is frequently preferable to score after the container wall blanks have been severed from the sheet and after the closures have been formed. For convenience of reference, reference herein to scoring "sheet" will contemplate scoring either a full sheet or a container wall or container wall blank which is a smaller sheetlike element.

As is shown in FIGS. 3, 4 and 5, scoring may be effected by a truncated indenter tool 20 which latter two provide positioned above the laminated container wall 22 and an anvil 24 which is in supporting underlying position with respect to the laminated end wall 22. In effecting scoring on a commercial scale with automatic equipment, the end wall 22 is received on the anvil 24 and the indenter tool 20 is rapidly brought downwardly to provide forceful impact with the metal panel 26 portion of the end wall 22. Depending upon the specific configuration of the indenter tool, the establishment of the score line may result either from severance and physical displacement of the metal or extruded metal flow or both.

With respect to aluminum container end walls, the metal panel 26 frequently has a thickness of about 0.008 to 0.0145 inch. Scoring in such walls is effected in such fashion as to leave a metal residual thickness in the score line of about 0.002 to 0.006 inch and generally about 0.0025 to 0.0045 inch. In order to effect such a reduction and maintain commercially acceptable speeds of production, the force with which the scoring tool 20 engages the metal panel 26 is such that pressures in the score line region frequently reach the range of 100,000 to 300,000 pounds per square inch. It is this substantial impact which the laminated protective barrier structure of this invention must resist in order to permit the manufacture of easy open container walls of this type without necessitating repair coating in order to ensure effective corrosion protection and durable adhesive bonding. The problem with respect to the amount of force which the barrier materials must withstand becomes particularly acute with respect to certain aluminum alloys which are frequently employed commercially in the extra hard H19 temper. The thickness of the sheet, the nature of the alloy and the temper all may contribute to increased strength requirements of the barrier materials if they are to function effectively for the purpose intended herein.

In the form illustrated in FIGS. 3 through 5, the indenter tool 20 is initially positioned above the top surface 28 of metal panel 26. In the form shown in FIG. 4 (a gap being provided between the indenter tool 20 and panel 26 for clarity of illustration), the score line 30 has been partially formed. Completion of the score line has been effected in the form shown in FIG. 5.

It is noted, as is seen in FIGS. 4 and 5, that a downwardly directed extension 32 of the metal panel 26 is disposed in underlying position with respect to the score line 30. Also, the total thickness of the barrier material 4 and outer protective member 10 has been subjected to thinning in the region underlying score line 30. This thinning occurs as a result of flow, transverse with respect to the score line, established in barrier material 4 and/or the outer protective member 10 due to the substantial compressive force applied by indenter tool 20 in cooperation with supporting anvil 24. The total thinning of the barrier material 4, the adhesive coatings and the outer protective material within the portions underlying the score line is about 10 to 50 percent of their original total thickness and preferably about 10 to 20 percent.

It is noted, however, that the thinning was not sufficient to produce any openings in material 4 and member 10 which would permit communication between lower surface 34 of metal panel 26 and any container contents which are positioned on the opposite side of the barrier material. It is also preferable that the thinning not be sufficient as to substantially impair the barrier properties of the barrier materials to the point where damaging penetration of the materials by the container contents can occur.

It will, therefore, be appreciated that the container wall structure of this invention is such that the metal panel 26 has been weakened, but not lanced, to provide a severable and/or removable sector. Prior to opening, the panel 26 remains continuous and serves as a physical barrier to the entry of external materials into the container. Whether the weakened sector is removable or not, the score line will be severed in effecting access to the container interior. The term "removable sector" as used herein shall refer to panel structures which require score line severance to gain access to the container interior regardless of whether the weakened sector is actually removed from the panel.

The barrier material 4 and the outer protective member 10 serve to prevent potentially corrosive contact between the container contents and the undersurface 34 of the metal panel 26. In the form illustrated, the barrier material 4 and outer protective member 10 are continuously and effectively bonded to each other and to the metal panel 26 by means of adhesives 6, 14. The integrity of the barrier materials 4, 10 also prevents the container contents from reducing the bond of adhesive 6 by corroding the metal to which it is secured and thus exposing additional metal and permitting progressive corrosion over a substantial portion of the entire lower surface 24.

In numerous easy open containers of this type, a rigid lever pull tab is secured within the removable sector by appropriate fastening means such as by an integrally formed rivet. This presents no additional problems with respect to maintaining the integrity of the barrier members of this invention, as the mechanical demands of such formation are substantially less than those encountered with respect to scoring.

It will be appreciated that the adhesive coatings 6, 14 while generally substantially thinner than barrier material 4 and outer protective member 10 may nevertheless contribute to the total barrier resistance to penetration of potentially corrosion producing materials to the lower surface 34 of metal panel 26.

Several tests were performed in order to verify the effectiveness of the barrier of this laminated material.

EXAMPLE 1

Ten sheets of an aluminum base magnesium alloy (5052) in the extra hard H19 temper having a sheet thickness of about 0.010 inch were coated on one side with a clear epoxy amine coating in the amount of 3 mg./sq. in. The reverse side of these sheets was coated with a polyurethane adhesive in the amount of 1 mg./sq. in. The polyurethane adhesive was dried at 250° F. for 2 minutes. A polyethylene-polyester laminate film was then sealed to the panel with the polyethylene film in contact with the polyurethane adhesive. The panels were reheated for 10 minutes at 300° F. and allowed to cool. Circular panel portions were then blanked from the sheet and converted into 211 diameter can ends. The ends were subsequently scored in the conventional manner to define a weakened panel sector. No repair coating was applied. The panel ends were then compounded with a gasket material and sealed to cans containing a variety of products including hydrogenated vegetable oil, liquid vegetable oil, water at 212° F., fresh pork shoulder meat and vegetable juice cocktail. The water and pork were subsequently processed for 45 minutes at 250° F. The vegetable juice cocktail cans had been filled at an elevated temperature and the remaining cans were filled at room temperature. The packages were investigated after seven days. Examination of the ends revealed that the undersurface of the metal ends has been maintained free from exposure to the container contents. The ends employed with the water sample assumed a slightly clouded color but were otherwise uneffected and no effect whatsoever was noted with respect to the ends employed with the other food products.

EXAMPLE 2

In order to compare the product of conventional practices, several sheets of the same alloy employed in example 1 were coated on both sides with an epoxy phenolic by means of a solvent which was subsequently evaporated and the coating cured by heating the panels at 400° F. for a period of 10 minutes. Circular panel portions were then blanked from the sheet and converted into 211 diameter can ends. The can ends were subsequently scored in the conventional manner to define a frangible panel sector. Careful examination of the scored can ends revealed fractured portions of the epoxy phenolic coatings which would have required the subsequent application of a repair coating in order to produce a commercially acceptable can end.

EXAMPLE 3

Tests were made in order to determine the effectiveness of bonding obtained by various adhesives. Aluminum can ends having a thickness of 0.0105 inch were made from 5052-H19 alloy and were coated on the outside with a conventional coating in the amount of 3 mg./sq. in. They were converted to easy open can ends by scoring to provide a residual metal depth of about 0.0045 to 0.005 inch. The curled peripheral edges of the ends were compounded with a conventional gasket material. Some of the ends had a film of a laminate of low density polyethylene-polyvinylidene chloride-polyethylene (sold under the trade name Saranex PZ2000.21) adhesively secured to their underside. Others had a polypropylene film (sold under the trade name Extrudo PP12B) secured to their underside. Bonding was effected with various adhesives. Catalysts of the type normally employed for these adhesives were used. These ends were secured to 211×304 tinplate cans containing tomato soup. After 18 hours of exposure to the food product, the ends were observed in order to visually determine the degree of blistering which is an indication of imperfections in the adhesive bond between the film and the aluminum substrate. The best performance with each type of film was obtained in those samples employing an epoxy adhesive. These samples had no visible blistering with each type of film. Also yielding superior results were a polyester adhesive and a polyurethane adhesive which yielded only slight visual blistering with each type of film.

In the method of this invention, a metal sheet is provided with a continuously bonded film of barrier material which is secured to the sheet by an adhesive coating. The metal sheet is subsequently scored, either as a unit or after it has been severed into smaller metal sheets or blanks. The scoring is effected to such a depth as to leave residual metal along the score line of about 0.002 to 0.006 inch in thickness. As a result of the high impact pressure applied in the score operation, the barrier material underlying the score line is thinned. As the compressive force is applied, the barrier material is initially compressed and ultimately is caused to flow outwardly away from the score line. Thus, the metal which maintains its integrity protects the contents from exposure to foreign materials disposed exteriorly of the container and the barrier materials protect the metal panel from damaging contact with the container contents.

In one form of the invention an outer protective film is adhesively bonded to the barrier material. This film preferably has a thickness of about 0.0005 to 0.001 inch. This outer protective material film serves to both strengthen the laminate and increase its barrier properties. As a result of the effective continuous adhesive bonding of the laminate coupled with the strength and barrier properties of the barrier materials, a frangible sector may be scored into the metal panel without requiring repair coating to protect the undersurface of the metal panel while in use.

In addition to the foregoing properties, the materials of this invention have been so selected that the adhesive bond between the barrier material 4 and the undersurface 34 of panel 26 is greater than the shear strength of the adhesive 6, 14 and materials 4, 10. Thus, when the score line is fractured during opening of the container, this portion of the barrier materials will be removed with the sector and thereby present no obstruction to the free removal of the container contents. In addition, the thinning of the barrier materials during scoring further reduces the shear resistance to severance of these materials when opening the container.

Commercial requirements make it extremely desirable to provide a single type of container end wall for use with a broad range of products. The materials contacting the products must have no appreciable detrimental effect thereon. This is particularly true with respect to food products. As is commonly known as result of the variations in chemistry of the food products as well as preservatives, seasoning and other additives provide a broad spectrum of chemical materials which are potentially corrosive with respect to metals. The materials of this invention provide an effective barrier with respect to a broad range of materials including those which are particularly troublesome such as fresh pork shoulder meat, vegetable juice cocktail and tomato soup (See examples 1 and 3). Also, these materials are compatible with food products and produce no damaging effect thereon even when stored for extended periods of time.

The method and product of this invention, therefore, are uniquely suited to providing a protective barrier coating which will serve to prevent corrosion, both through food attack and through one of the materials acting as a sacrificial anode during use in a container. The materials also provide a laminate structure of such strength that the barrier properties are not destroyed by the strong impact force encountered during commercial scoring operations. This is true even with respect to hard temper materials. In addition, the laminate may advantageously be formed while the metal is in sheet form. It requires no special handling during normal container end wall manufacture, scoring and sealing. All of this is economically effected without the need for expensive materials or a substantial capital investment in new equipment.

Whereas particular embodiments of the invention have been described above for purposes of illustration, it will be evident to those skilled in the art that numerous variations of the details may be made without departing from the invention as described in the appended claims.

We claim:

1. A method of manufacturing a laminated metal container wall having an integral opening device, comprising
    providing a metal sheet having a continuous portion to be converted to said container wall,
    providing on said metal sheet a layer of an adhesive selected from the group consisting of epoxy, polyester and polyurethane,
    securing to said metal sheet by means of said adhesive layer a continuous layer of barrier material selected from the group consisting of polyethylene and cast polypropylene,
    subsequently scoring said continuous portion of said metal sheet to define a removable sector therein,
    effecting said scoring while preserving the integrity of said barrier by maintaining continuity of said layer of said barrier material,
    said scoring of said continuous portion of said sheet being effected to such a depth as to leave residual metal along all of said score line and said residual metal having a depth of about 0.002 to 0.006 inch, and
    simultaneously with said scoring reducing the thickness of said layer of barrier material in the regions immediately underlying said scoring without penetrating entirely through said layer by compressibly established flow to reduce the shear resistance to severance of said adhesively secured layer of barrier material when said laminated container wall is opened, whereby said metal sheet panel will have a weakened removable sector with an adhesively bonded underlying coextensive barrier material secured thereto.

2. The method of claim 1 including
    said barrier material is selected from the group consisting of low density polyethylene, high density polyethylene and cast polypropylene,
    providing said layer of barrier material continuously over at least that portion of said container wall which will be directly exposed to the container interior,
    applying said adhesive layer as a substantially continuous coating at about 1.0 to 5.0 mg./sq. in.,
    applying said barrier material in the form of a film having a thickness of about 0.002 to 0.003 inch, and
    adhesively securing to said barrier material an outer protective material selected from the group consisting of a polyester, polyvinylidene chloride, polyvinyl chloride, high density polyethylene and medium density polyethylene.

3. The method of claim 2 including
    said outer protective material is a substantially continuous film secured to said barrier member by means of a second adhesive selected from the group consisting of epoxy, polyester and polyurethane, and
    said second adhesive applied as a coating in the amount of about 1.0 to 5.0 mg./sq. in.

4. The method of claim 2 including
    said barrier material and said outer protective material each being a film,
    said adhesive coatings of substantially uniform thickness and establishing continuous bonds, and
    said protective material film having a thickness of about 0.00025 to 0.001 inch.

5. The method of claim 2 including
    after establishing said laminate but prior to scoring, severing can end blanks from said sheet, and
    subsequently scoring said blanks without any subsequent application of a repair coating to protectively cover the undersurface of said scoring.

6. The method of claim 5 including
said metal sheet is aluminum,
prior to adhesively bonding said barrier material to said metal sheet said outer protective material is secured to said barrier material,
effecting said scoring by means of a generally V-shaped indenter tool which engages the top surface of said can end blanks and a generally flat supporting anvil which contacts the outer protective material, and
during said scoring operation the reduction in total thickness of said barrier material, said adhesive coatings and said outer protective material within the portions thereof underlying said score line is about 10 to 50 percent of said original total thickness.

7. The method of claim 5 including
after establishing said laminate but prior to scoring, heating said laminate to a temperature of about 150° to 475° F. for a period of about 10 to 60 minutes to establish a uniformly bonded continuous protective barrier structure.

* * * * *

UNITED STATES PATENT OFFICE
CERTIFICATE OF CORRECTION

Patent No. 3,632,461            Dated January 4, 1972

Inventor(s) Herbert Gayner and John N. Demsey

It is certified that error appears in the above-identified patent and that said Letters Patent are hereby corrected as shown below:

| | |
|---|---|
| Second paragraph of Abstract | Delete the second paragraph of the Abstract |
| Col. 4, line 51 | After "which" delete "is" and insert --latter two provide--. |
| Col. 4, line 54 | After "which" delete "latter two provide" and insert --is--. |

Signed and sealed this 6th day of June 1972.

(SEAL)
Attest:

EDWARD M. FLETCHER, JR.
Attesting Officer

ROBERT GOTTSCHALK
Commissioner of Patents